(12) United States Patent
Howard et al.

(10) Patent No.: US 11,592,327 B2
(45) Date of Patent: Feb. 28, 2023

(54) TORSIONAL-LATERAL CROSS-COUPLING DETECTION

(71) Applicant: Baker Hughes Oilfield Operations LLC, Houston, TX (US)

(72) Inventors: Brian F. Howard, Reno, NV (US); David R. O'Connor, Gardnerville, NV (US); John W. Grant, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/382,927

(22) Filed: Jul. 22, 2021

(65) Prior Publication Data

US 2022/0026263 A1    Jan. 27, 2022

Related U.S. Application Data

(60) Provisional application No. 63/056,158, filed on Jul. 24, 2020.

(51) Int. Cl.
*G01H 1/00* (2006.01)
*G01M 13/028* (2019.01)

(52) U.S. Cl.
CPC .......... *G01H 1/003* (2013.01); *G01M 13/028* (2013.01)

(58) Field of Classification Search
CPC .......... G01H 1/003; G01H 1/00; G01H 1/006; G01H 1/10; G01M 13/028
See application file for complete search history.

(56) References Cited

U.S. PATENT DOCUMENTS

| 5,038,614 A * | 8/1991 | Bseisu | G01M 3/243 73/598 |
| 5,520,061 A * | 5/1996 | Thibault | G01H 1/003 73/866.5 |
| 5,949,162 A * | 9/1999 | Mishkevich | H02K 7/09 318/623 |
| 2011/0184547 A1* | 7/2011 | Loutfi | G05B 23/0235 700/265 |

FOREIGN PATENT DOCUMENTS

JP    H0718747 B2 *    6/1995    ............. G01N 29/12

* cited by examiner

*Primary Examiner* — Natalie Huls
*Assistant Examiner* — Cynthia L Davis
(74) *Attorney, Agent, or Firm* — Mintz Levin Cohn Ferris Glovsky and Popeo, PC (57) ABSTRACT

A method includes receiving data characterizing time-dependent lateral vibration of a shaft of a machine, the lateral vibration indicative of motion of at least a portion of the shaft perpendicular to a first direction. The lateral vibration is detected by a first sensor located at a first predetermined location on the shaft. The method further includes, receiving data characterizing time-dependent torsional vibration of the shaft, the torsional vibration indicative of rotation of the shaft around the first direction. The torsional vibration is detected by a second sensor located at a second predetermined location on the shaft. The method also includes calculating a coherence of the data characterizing time-dependent lateral vibration and the data characterizing time-dependent torsional vibration. The method further includes identifying, based on the coherence, a first frequency value in the frequency domain indicative of coupling between the time-dependent lateral vibration and the time-dependent torsional vibration.

25 Claims, 8 Drawing Sheets

TORSIONAL-LATERAL CROSS-COUPLING DETECTION

RELATED APPLICATION

This application claims priority under 35 U.S.C. § 119(e) to U.S. Provisional Patent Application No. 63/056,158 filed on Jul. 24, 2020, the entire content of which is hereby expressly incorporated by reference herein.

BACKGROUND

Coherence can be used to examine the relation between two signals or data sets. For example, coherence can be used to estimate the power transfer between input and output of a linear system. Additionally, for a linear system, coherence can be used to estimate the causality between the input and the output.

SUMMARY

Various aspects of the disclosed subject matter may provide one or more of the following capabilities.

A method includes receiving data characterizing time-dependent lateral vibration of a shaft of a machine, the lateral vibration indicative of motion of at least a portion of the shaft perpendicular to a first direction. The lateral vibration is detected by a first sensor located at a first predetermined location on the shaft. The method further includes, receiving data characterizing time-dependent torsional vibration of the shaft, the torsional vibration indicative of rotation of the shaft around the first direction. The torsional vibration is detected by a second sensor located at a second predetermined location on the shaft. The method also includes calculating a coherence of the data characterizing time-dependent lateral vibration and the data characterizing time-dependent torsional vibration. The method further includes identifying, based on the coherence, a first frequency value in the frequency domain indicative of coupling between the time-dependent lateral vibration and the time-dependent torsional vibration. The coupling includes transfer of energy from the lateral vibration to the torsional vibration or vice versa at the first frequency. The method also includes providing the first frequency and/or at least a portion of the coherence.

One or more of the following features can be included in any feasible combination.

In one implementation, the first predetermined location is proximal to a coupling location of the shaft with a driving mechanism configured to drive the shaft. In some implementations, the driving mechanism is a gearbox configured to rotate the shaft about the first axis. In some implementations, the driving mechanism is an induction motor configured to rotate the shaft about the first axis. In some implementations, the second predetermined location is proximal to a node of the lateral vibration of the shaft.

In some implementations, calculating the coherence further includes calculating a lateral frequency spectrum by transforming the time-dependent lateral vibration from the time domain to the frequency domain; and calculating a torsional frequency spectrum by transforming the time-dependent torsional vibration in the frequency domain. The coherence is based on the product of the lateral frequency spectrum and the torsional frequency spectrum.

In some implementations, identifying the first frequency value in the frequency domain includes identifying a first peak of the coherence wherein the first peak has a value greater than a predetermined threshold value and the first peak is located at the first frequency. In some implementations, the method further includes identifying a second frequency value in the frequency domain by at least identifying a second peak of the coherence wherein the second peak has a value greater than the predetermined threshold value and the second peak is located at the second frequency.

In some implementations, the calculating includes transforming the time-dependent lateral vibration and the time-dependent torsional vibration from a time domain to a frequency domain. In some implementations, the first sensor is an eddy-current sensor. In some implementations, the second sensor is one of a magnetostrictive torsional sensor, a demodulated torsional sensor, and a strain torsional sensor.

In some implementations, the first sensor is an axial vibration sensor configured to detect and provide a signal characterizing a time-dependent axial vibration of the shaft. The axial vibration is indicative of motion of at least a portion of the shaft parallel to the first direction. The axial vibration sensor is located at the first predetermined location on the shaft. In some implementations, the second sensor is an axial vibration sensor.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Industrial systems can include machines with multiple moving parts that can be coupled together. In some implementations, a given machine part can simultaneously experience multiple motions. For example, a machine part (e.g., a shaft) can simultaneously move (e.g., vibrate) along a lateral direction, an axial direction and a torsional direction. The various vibrations can be decoupled from each other (e.g., a lateral/axial vibration may not effect a torsional vibration). However, changes in the machine (e.g., formation of a crack, asymmetric loading of the shaft, etc.) can lead to a coupling between lateral/axial vibration and torsional vibration. For example, energy associated with lateral/axial vibration can transfer to torsional vibration (or vice versa). This can result in undesirable operation of the machine (e.g., machine behaving in an unpredictable manner, damage to the machine, etc.). Therefore, it is desirable to identify coupling between lateral/axial vibration and torsional vibration. In some implementations of the current subject matter, coupling between lateral/axial and torsional vibration coupling can be identified from determination of a cross-coupling between lateral/axial vibration and torsional vibration. This can include determination of the lateral/axial vibration via a first sensor operatively coupled to the machine and determination of the torsional vibration via a second sensor operatively coupled to the machine. In some implementations, the sensors can be placed at predetermined locations on the machine such that the detection of the target vibration (e.g., lateral vibration, torsional vibration, etc.) is improved (e.g., through selective detection). This can result in improved calculation of coherence and identification of vibration frequencies at which the coupling is occurring.

In some implementations of time-invariant systems, it can be helpful to understand the linear relationship between a single input and single output therein. Coherence can be used to understand this relationship in the frequency domain. Coherence is a statistical measurement that can describe relationship between signals. Coherence function (e.g., the magnitude-square coherence) can estimate the power transfer between two signals. The coherence function (or "coherence") assumes that the transfer function between the signals is linear and that the system is statistically similar over time. Coherence returns a value between 0 and 1, inclusive, where 0 indicates no relationship and 1 indicates an ideal linear system.

Figure 1:
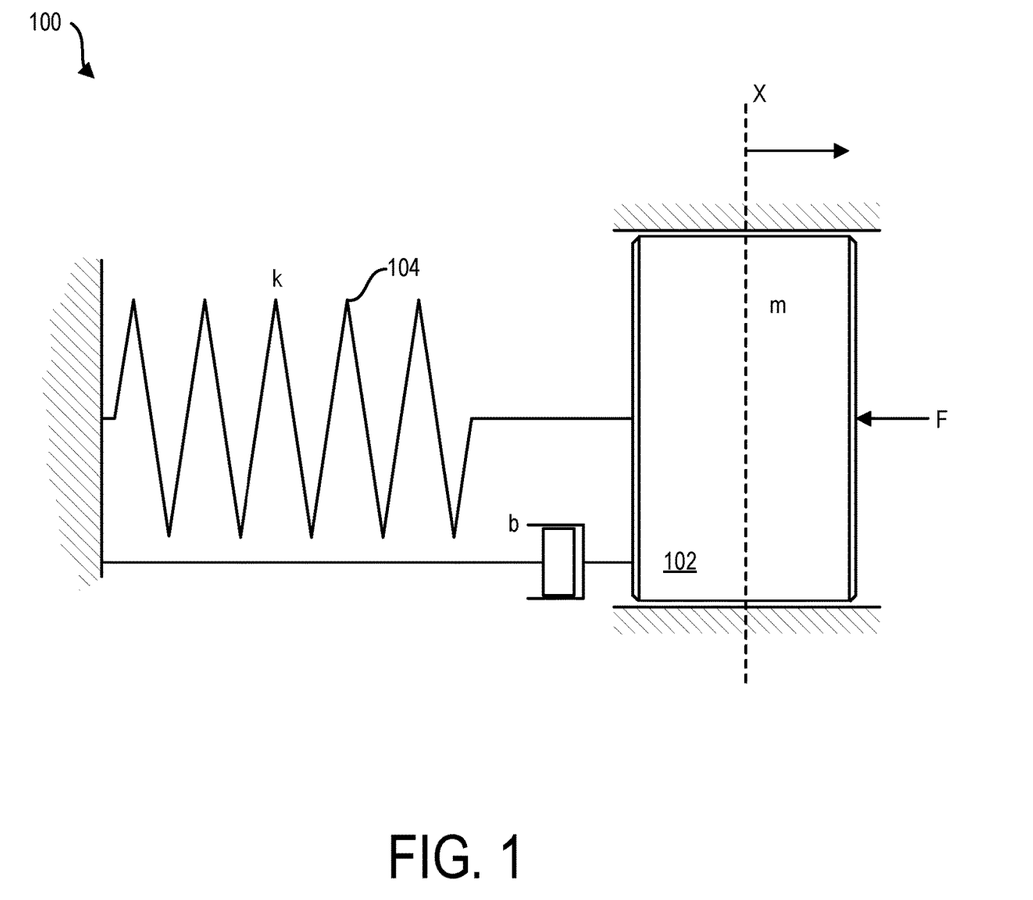
FIG. 1 illustrates an exemplary implementation of a mass-spring-damper system.

A spring-mass-damper system can illustrate coherence applications in mechanical systems analysis. FIG. 1 illustrates an exemplary implementation of a mass-spring-damper system 100. The system 100 includes an object 102 (having a mass m) coupled to a spring 104 having a stiffness k. The system 100 is characterized by a damping factor b and a force F that is applied on the object 102. The undamped natural frequency of the system is denoted by:

$$\omega_0 = \sqrt{\frac{k}{m}}$$

If mass m of the object is 1 kilogram, and the stiffness k is $$2000 \, \frac{\text{kg}}{s^2},$$

the natural frequency is given by:

$$\omega_0 = \sqrt{\frac{k}{m}} = \sqrt{\left(\frac{2000 \text{ kg}}{s^2}\right)\left(\frac{1}{1 \text{ kg}}\right)} = \sqrt{2000} \, \frac{\text{rad}}{s} \approx 7.1 \text{ Hz}$$

Figure 2:
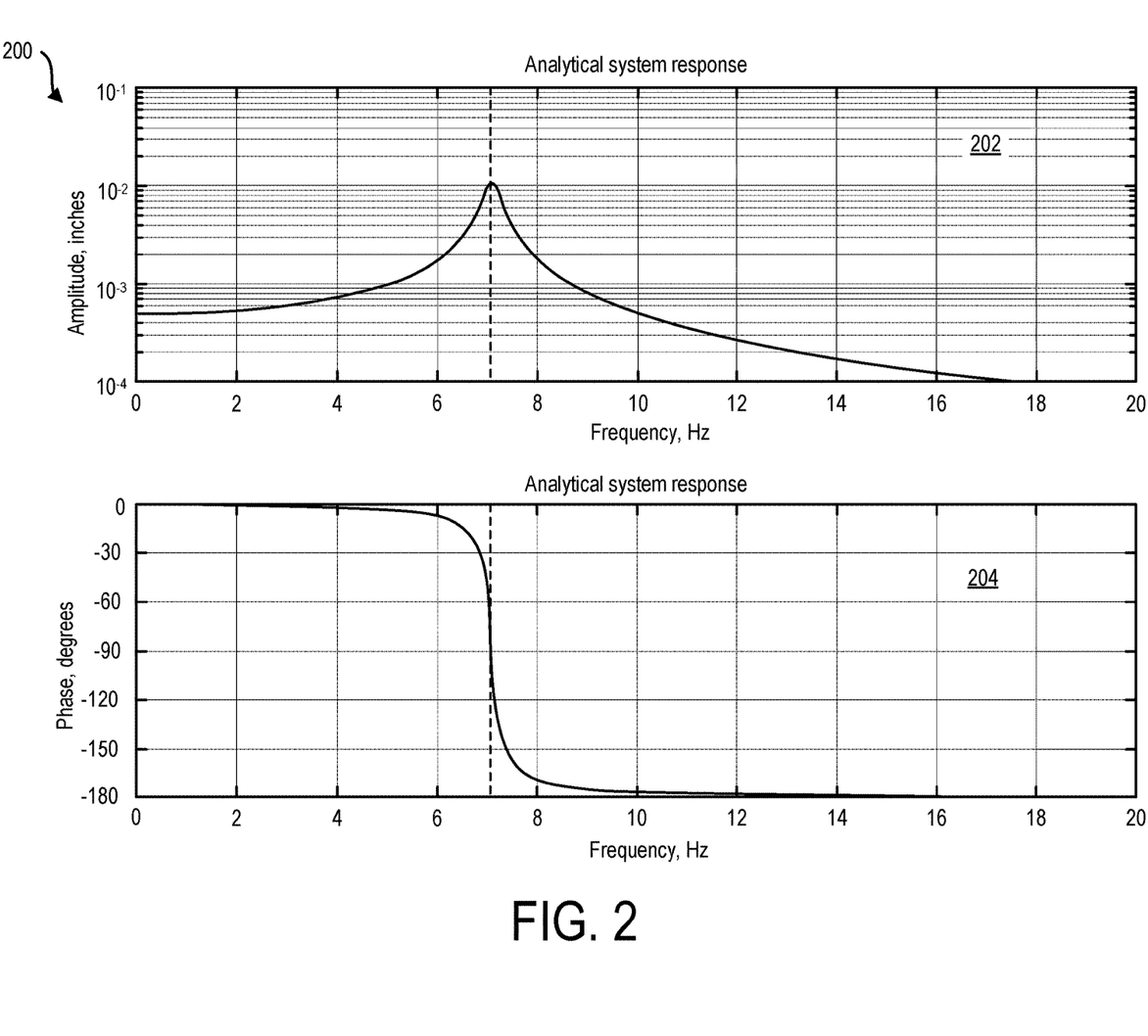
FIG. 2 illustrates an exemplary plot of response of the mass-spring-damper system in FIG. 1.

FIG. 2 illustrates an exemplary plot 200 of response of the mass-spring-damper system 100. The exemplary plot 200 includes an amplitude plot 202 and phase plot 204. The amplitude plot 202 includes a graph of the absolute value of the response of the mass-spring-damper system 100. The phase plot 204 includes a graph of the phase (or angle) of the response of the mass-spring-damper system 100.

Figure 3:
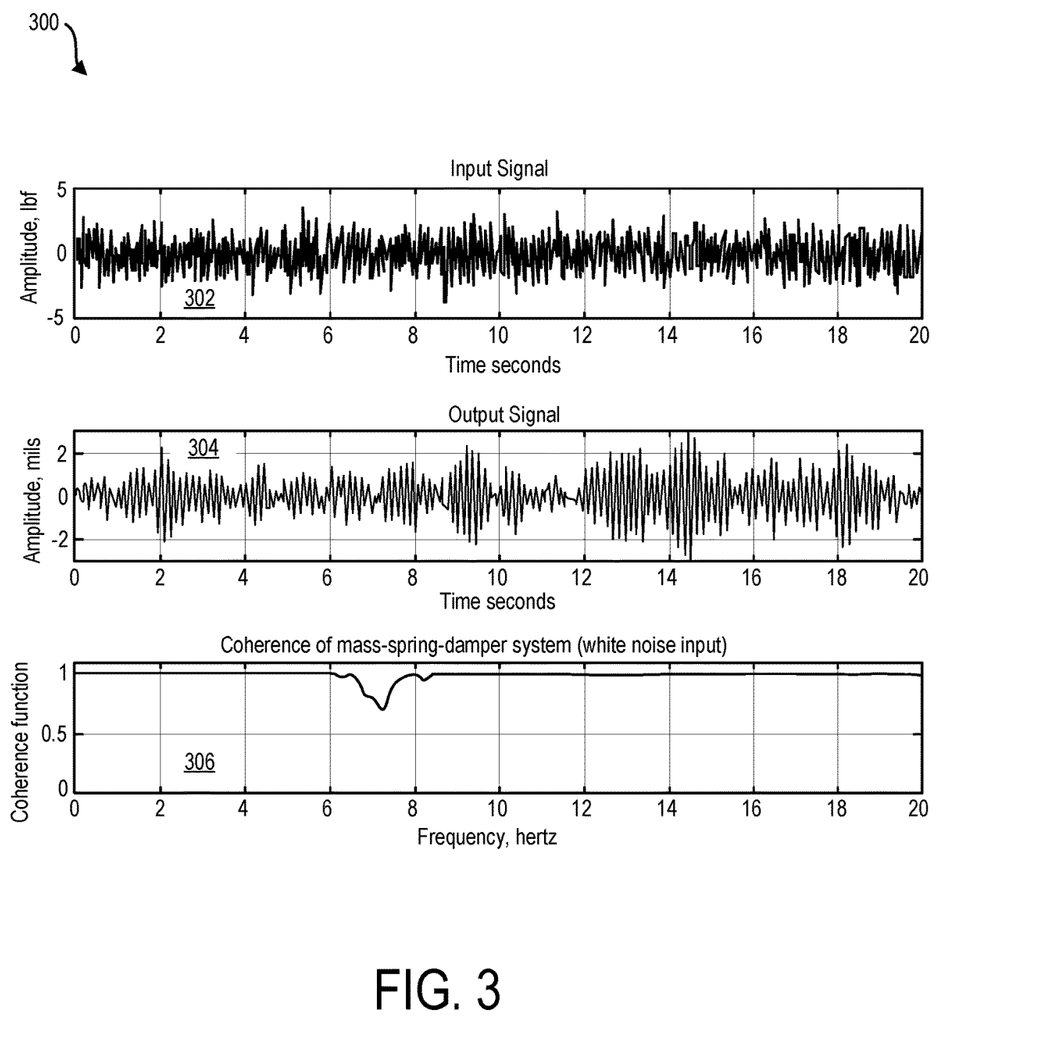
FIG. 3 illustrates an exemplary plot of coherence of input signal and output signals of the mass-spring-damper system in FIG. 1.

In some implementations, multiple spectral frequencies of the mass-spring-damper system 100 can be excited by using white noise as the input signal (e.g., rather than an impulse signal). FIG. 3 illustrates an exemplary plot 300 of coherence of input signal (white noise) and output signal of the mass-spring-damper system 100. The coherence is indicative of coherence between the input and the output signals. For example, the coherence is close to unity outside the 6 Hz-8 Hz frequency band (e.g., which matches the region of linear response in FIG. 2). In the 6 Hz to 8 Hz frequency band, the coherence drops below unity (e.g., because resonance is non-linear). Coherence is close to unity after resonance attenuates at 8 Hz. For example, the coherence can fall below unity because of the non-linear response of the system. In some implementations, the coherence can fall below unity because of noise in the system and/or because the system is more complicated than a single input-single output.

Figure 4:
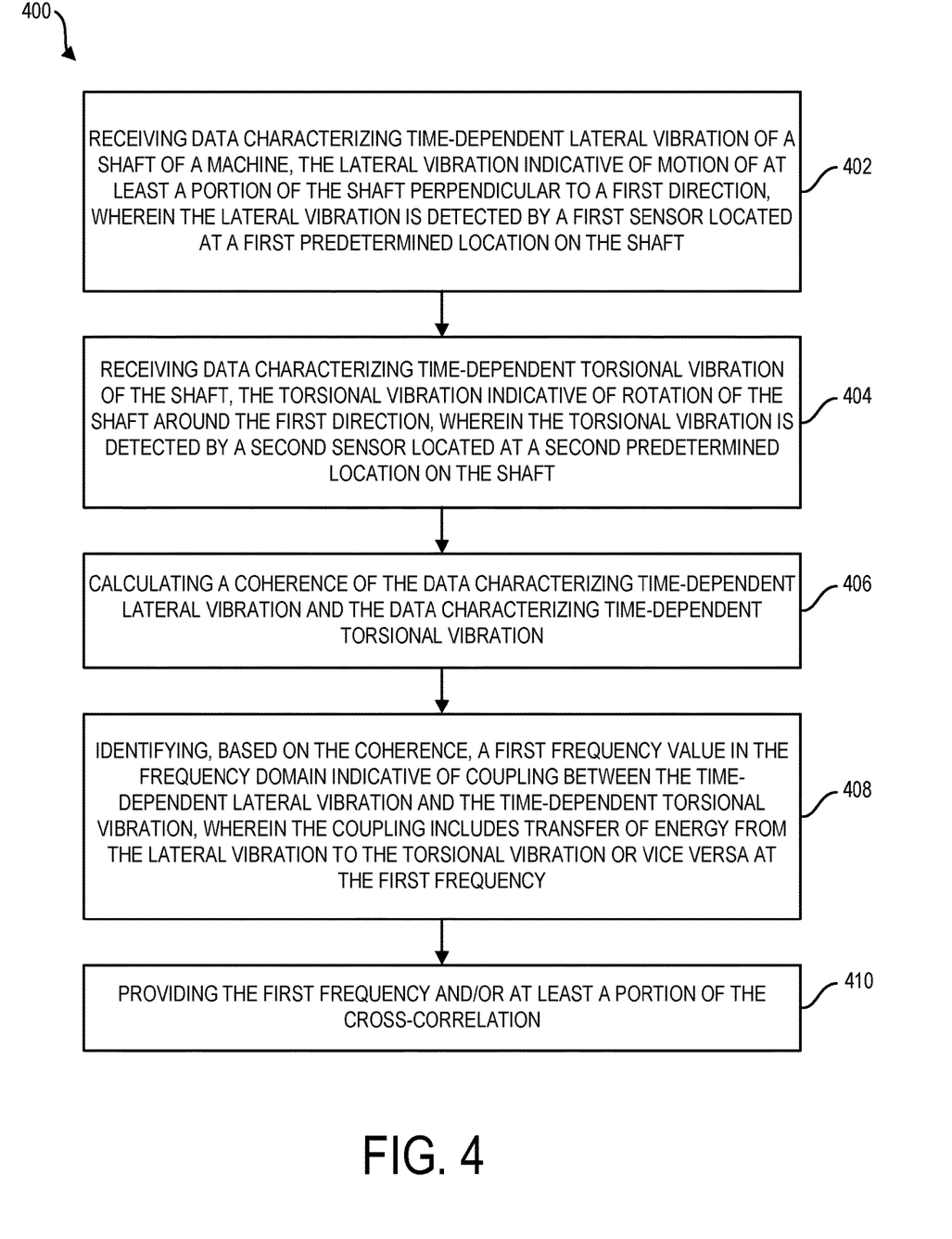
FIG. 4 is a flow chart of an exemplary method for determining cross-coupling between lateral vibration and torsional vibration.

FIG. 4 is a flow chart of an exemplary method 400 for estimating cross-coupling (e.g., via coherence) between lateral vibration and torsional vibration. At step 402, data characterizing time-dependent lateral vibration (or axial vibration) of a shaft of a machine is received (e.g., by a processor in computing device 560). The lateral vibration of the shaft can include motion of the shaft (or a portion thereof) that is perpendicular to a first direction associated with the shaft (e.g., along an axis of the shaft). The lateral vibration can be detected by a first sensor (e.g., an eddy-current probe) operatively coupled to the shaft. In some implementations, axial vibration of the shaft can include motion of the shaft (or a portion thereof) that is parallel to the first direction 510. The axial vibration can be detected by the first sensor 512 (e.g., an eddy-current probe). In some implementations, the axial vibration can be detected by the second sensor 514.

Figure 5:
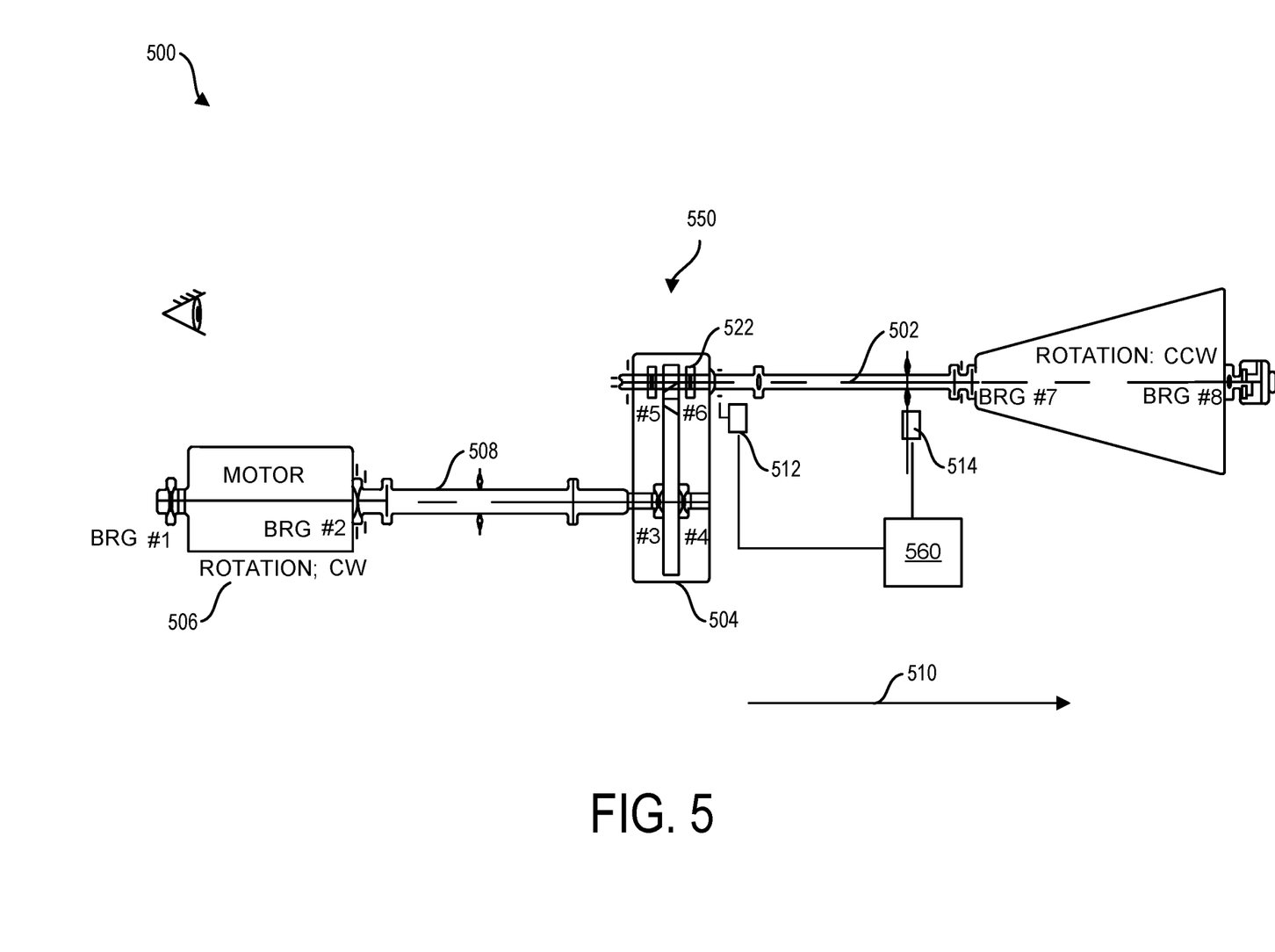
FIG. 5 illustrates an exemplary machine system.

FIG. 5 illustrates an exemplary machine system 500 that includes a motor-driven compressor train 550 and a computing device 560. The compressor train 550 includes a first shaft 502 and a gearbox 504 that can drive the first shaft 502. The gearbox 504 in turn is driven by a motor 506 via a second shaft 508. The gearbox 504 can be a speed increasing gearbox and the speed of the first shaft 502 can be greater than that of the second shaft 508. The first shaft 502 can vibrate perpendicular to the direction 510 (referred to as lateral vibration) and around the direction 510 (referred to as torsional vibration). The machine system 500 can include a first sensor 512 (e.g., an eddy-current probe, seismic sensor, vibration sensor, etc.) that can detect the lateral vibration of the first shaft 502. Lateral vibration measurement data can be transferred from the first sensor 512 to a computing system 560 (e.g., as described at step 402). The first shaft 502 can vibrate parallel to the direction 510 (referred to as axial vibration). The first sensor 512 (e.g., an axial vibration sensor, etc.) can detect the axial vibration of the first shaft 502. Axial vibration measurement data can be transferred from the first sensor 512 to the computing system 560 (e.g., as described at step 402).

Returning back to FIG. 4, at step 404, data characterizing time-dependent torsional vibration of the shaft is received (e.g., by a processor). The torsional vibration of the shaft can include motion of the shaft (or a portion thereof) around the first direction (e.g., around an axis of the shaft). The torsional vibration can be detected by a second sensor (e.g., a magnetostrictive torsional sensor, a strain torsional sensor, a demodulated torsional sensor [e.g., sensor that detects demodulation of a toothed wheel], etc.) operatively coupled to the shaft. As illustrated in FIG. 5, the machine system 500 can include a second sensor 514 (e.g., a magnetostrictive sensor, strain gages, sensor that detects demodulation of a toothed wheel, axial vibration sensor, etc.) that can detect the torsional vibration of the first shaft 502. Torsional vibration measurement data can be transferred from the second sensor 514 to the computing system 560 (e.g., as described at step 404).

Torsional-lateral cross-coupling (e.g. coupling between torsional and lateral vibration) can occur in rotor systems (e.g., motor-driven compressor train 550) as a result of deformation in the shaft (e.g., crack and/or asymmetry in the shaft), coupling between gearbox and the shaft (e.g., side-loading of shaft), etc. As discussed above, the torsional-lateral cross-coupling can be determined based on vibration detection by the first sensor 512 and the second sensor 514. In some implementations, the locations of the first sensor 512 and/or second sensor 514 can improve torsional-lateral cross-coupling detection. In some implementations, the first sensor 512 can be placed at a first predetermined location that is better suited to detect lateral vibration. It may be desirable to place the first sensor 512 proximal to a coupling location 522 where the first shaft 502 is coupled to the driving mechanism of the gearbox 504 configured to rotate the shaft around the first direction 510. For example, it may be desirable to place the first sensor 512 on or adjacent to the outer covering of the gearbox 504. In some implementations, placing the first sensor 512 on or adjacent to the outer covering of the gearbox 504 can be desirable because this location is not a node of lateral vibration (e.g., coupling location 522) where no or very small lateral vibration occurs. Additionally, this location is not too far from the node of the lateral vibration (e.g., at anti-node of lateral vibration) where high amplitude of the lateral vibration (e.g., during a balance resonance) can damage the first sensor 512. This can result in improved detection of lateral vibration.

In some implementations, the second sensor 514 can be placed at a second predetermined location that is suitable to detect torsional vibration. It may be desirable to place the second sensor 514 proximal to a node of the lateral vibration of the shaft. The node of the vibration of the first shaft 502 can be a region where the shaft undergoes reduced (e.g., minimum lateral vibration). In some implementations, by placing the second sensor 514 at the node of the first shaft 502 the impact of lateral vibration on the detection of torsional vibration by the second sensor 514 can be reduced (e.g., when the second sensor is sensitive to changes in the lateral vibration). This can result in improved detection of torsional vibration (e.g., by reducing lateral vibration errors in the detection of torsional vibration). In some implementations, the first shaft 502 can experience multiple modes of torsional vibration. In this case, it can be desirable to select the second predetermined location of the second sensor that is close to nodes of multiple torsional nodal points.

Returning back to FIG. 4, at step 406, a coherence of the data characterizing time-dependent lateral vibration and the data characterizing time-dependent torsional vibration is calculated. The calculating includes transforming the time-dependent lateral vibration and the time-dependent torsional vibration (e.g., detected by the first sensor 512 and the second sensor 514, respectively) from a time domain to a frequency domain. In some implementations, a lateral frequency spectrum can be calculated by transforming the time-dependent lateral vibration from the time domain to the frequency domain (e.g., by applying a fourier transform). In some implementations, a torsional frequency spectrum can be calculated by transforming the time-dependent torsional vibration from the time domain to the frequency domain (e.g., by applying a fourier transform). In some implementations, the coherence can be calculated by multiplying the torsional frequency spectrum with the complex conjugate of the lateral frequency spectrum. Alternately, the coherence can be calculated by multiplying the lateral frequency spectrum with the complex conjugate of the torsional frequency spectrum.

Figure 6:
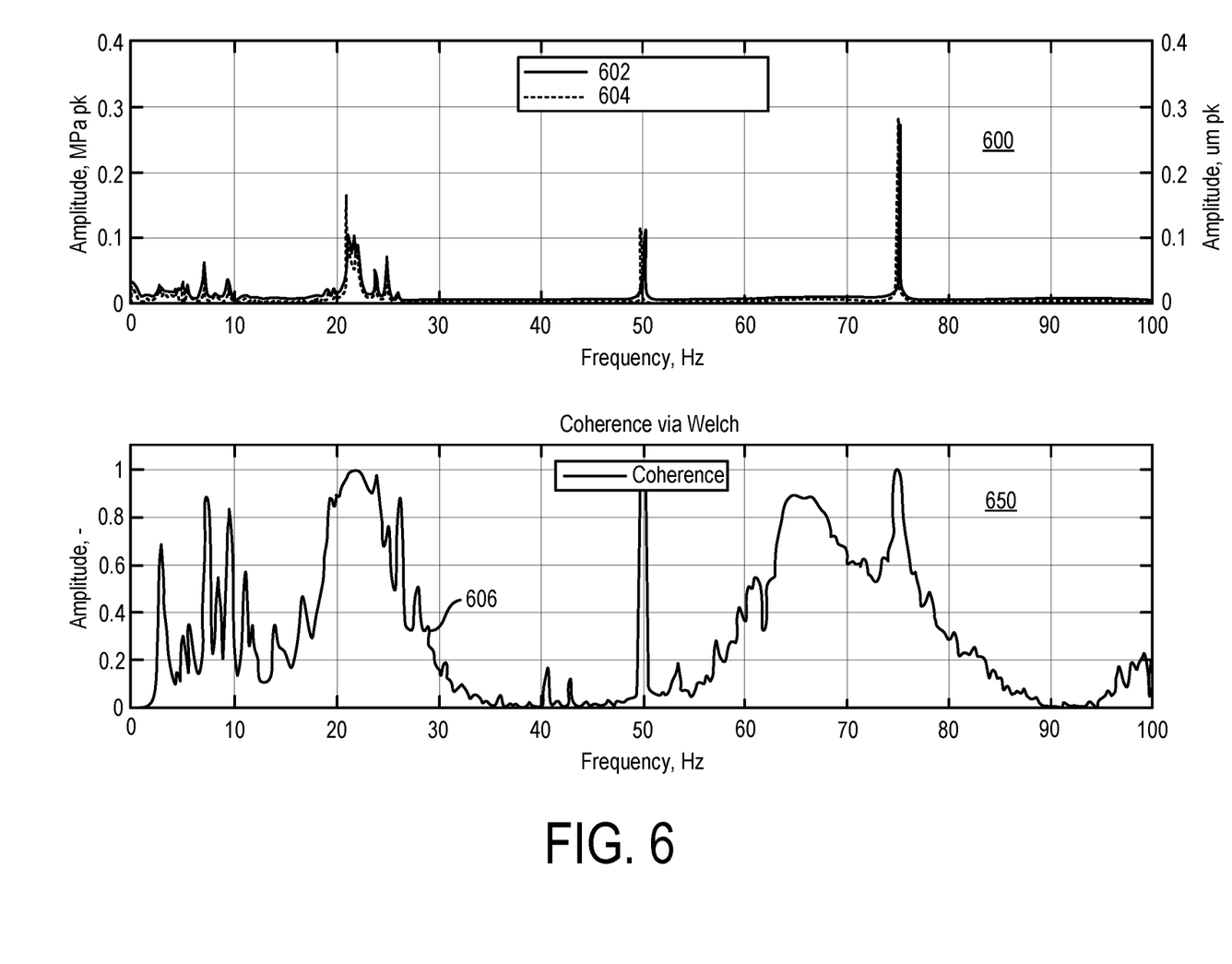
FIG. 6 illustrates exemplary plots of torsional vibration signal, lateral vibration signal and coherence.

FIG. 6 represents a plot 600 of amplitudes of exemplary torsional vibration signal 602 and exemplary lateral vibration signal 604 and a plot 650 of coherence 606 of the lateral and torsional vibration signals. For example, the torsional vibration signal 602 can be associated with the first shaft 502 and can be detected by the second sensor 514, and the lateral vibration signal 604 can be associated with the first shaft 502 and can be detected by the first sensor 512. As illustrated in plot 650, the coherence 606 peaks at around 22 hertz, 50 hertz, and 75 hertz. The 22 Hz frequency corresponds to the natural frequency of the torsional vibration which is cross coupled into the lateral vibration by the gearbox 504. The 50 hertz and 75 hertz frequencies correspond to the second harmonic and third harmonic of the second shaft 508 that have been cross coupled into the torsional signal for the first shaft 502 by the gearbox 504. The compressor train 550 can have a second torsional vibration frequency at 67 Hz. The coherence is nearly 1 near 67 Hz (e.g., a second torsional resonance) which indicates that there is some cross-coupling between torsional vibration and lateral vibration (e.g., energy is transferred from torsional vibration to lateral vibration) at this frequency. In some implementations, by looking at the coherence values that are close to unity the cross-coupling frequencies can be identified from the coherence plot.

At step 408, a first frequency value in the frequency domain indicative of coupling between the time-dependent lateral vibration and the time-dependent torsional vibration can be identified based on coherence calculated at step 406. In some implementations, the coupling can include transfer of energy from the lateral vibration to the torsional vibration or vice versa at a first frequency (or a first frequency band) or multiple frequencies (of multiple frequency bands).

In some implementations, identifying the first frequency value in the frequency domain includes identifying a first peak of the coherence wherein the first peak has a value greater than a predetermined threshold value and the first peak is located at the first frequency. For example, as illustrated in FIG. 6, the coherence 606 has peaks at around 22 Hz, 50 Hz, 67 Hz and 75 Hz. For example, if the predetermined threshold value is set to 0.9, a first peak can be selected and the corresponding frequency (e.g., 22 Hz, 50 Hz, 67 Hz, 75 Hz, etc.) can be identified as the first frequency at which coupling between the time-dependent lateral vibration and the time-dependent torsional vibration is occurring. In some implementations, multiple peaks can be selected. For example, a second peak having a value above the predetermined threshold value can be selected and the corresponding frequency (e.g., 22 Hz, 50 Hz, 67 Hz, 75 Hz etc.) can be identified as a second frequency at which coupling between the time-dependent lateral vibration and the time-dependent torsional vibration is occurring.

Figure 7:
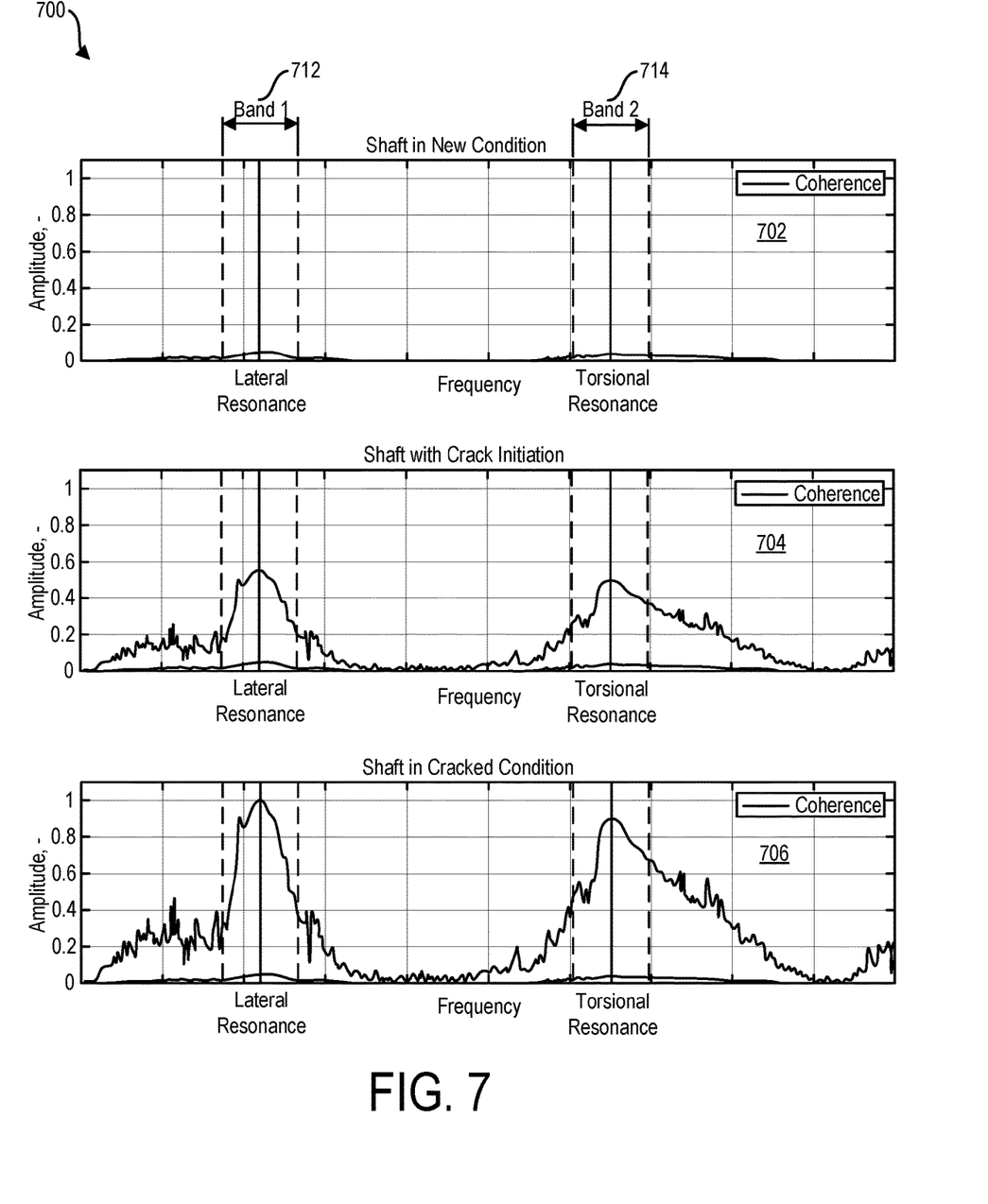
FIG. 7 illustrates exemplary coherence plots for shafts with varying degree of progression of crack.

In some implementations, cracks that appear in the shaft (e.g., shaft 502) can introduce cross-coupling between lateral and torsional vibration. The coherence between the lateral and torsional vibrations can be calculated and monitored (e.g., over a period of time). FIG. 7 illustrates exemplary coherence plots 700 for shafts in various conditions. Plot 702 is the coherence plot of new shaft (e.g., shaft without any cracks); plot 704 is the coherence plot of a shaft where cracks are beginning to appear; and plot 706 is the coherence plot of a shaft that has cracked. As shaft crack progresses, the shaft asymmetry increases which results in greater cross-coupling between lateral and increases. Using coherence the cross-coupling induced by the asymmetry can be seen to change with shaft condition. A first frequency band 712 and a second frequency band 714 (shown as blue dashed lines in FIG. 7) can be established around known torsional and lateral resonances. In some implementations, frequency sidebands can also be established around harmonics and sidebands of the fundamental vibration signals.

Figure 8:
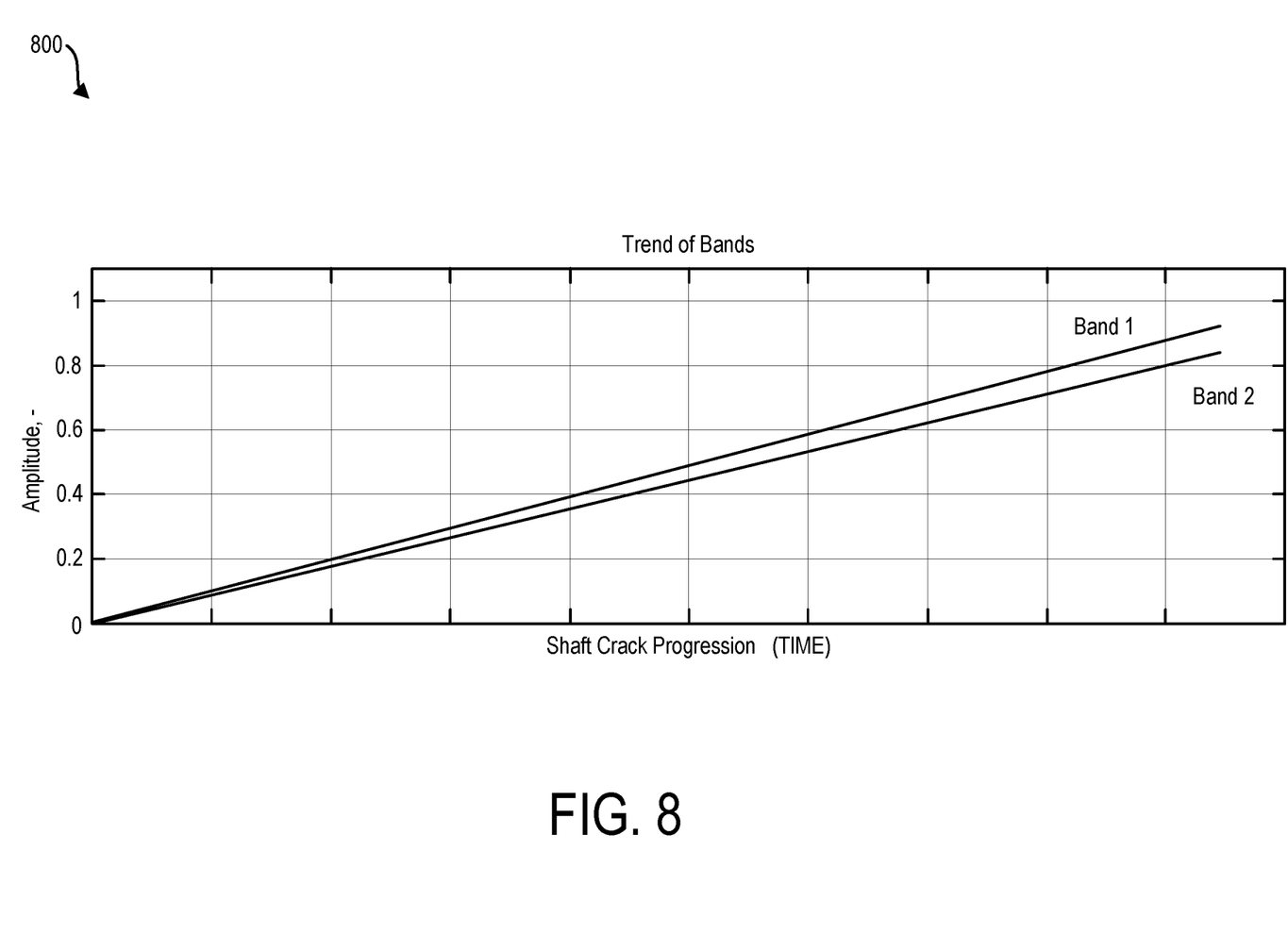
FIG. 8 illustrates and exemplary plot of a first set of peak values associated with the first frequency band and a second set of peak values associated with the second frequency band in FIG. 7.

FIG. 8 illustrates and exemplary trend plot 800 of a first set of peak values 802 associated with the first frequency band 712 and a second set of peak values 804 associated with the second frequency band 714. The horizontal x-axis of the trend plot represents time. The various peak values can be identified from the coherence calculated as the crack in the shaft progresses (e.g., coherence plots 702, 704, 706, etc.). The progress of the crack in the shaft can occur over a period of time. In some implementations, the state of the shaft can be determined by comparing the peak values with multiple predetermined threshold values. In some implementations, for a given coherence calculation (e.g., based on torsional and lateral vibration measured at a given time), the peak values (e.g., peak values of the two bands 712 and 714) can be compared with multiple predetermined threshold values, and a determination can be made regarding the state of the crack in the shaft. For example, if the peak value is above a first predetermined threshold value, a determination can be made that the shaft has cracked (e.g., as illustrated in plot 706); if the peak value is between the first predetermined threshold value and a second predetermined threshold value (lower than the first predetermined threshold value), a determination can be made that the crack has been initiated in the shaft (e.g., as illustrated in plot 704); and if the peak value is below the second predetermined threshold value, a determination can be made that no cracks exist in the shaft (e.g., as illustrated in plot 702).

In some implementations, first frequency band 712 and the second frequency band 714 can be used to track coherence in mechanical systems with known cross-coupling mechanisms, such as those that are discussed above. Loss of coherence can indicate a change in machine condition. Combined with other signal processing techniques (e.g., coherence analysis) leading/lagging causality can be established for the cross-coupling. This allows for identification of excitation source (e.g., a determination of lateral forcing function cross coupling into torsional and vice-versa). These methods can be extended to areas including transient analysis, blade pass on pumps, coherence with dynamic pressure, coherence with drive systems, and other processes.

Returning back to FIG. 4, at step 410, the first frequency and/or coherence information can be provided (e.g., to a user). For example, a plot of the coherence along with the identified frequencies (e.g., first frequency, second frequency, etc.) can be provided (e.g., in a graphical user interface [GUI] display space). In some implementations, the user can be notified of the state of the shaft (e.g., no crack on the shaft, crack beginning to appear, the shaft has cracked, etc.).

Other embodiments are within the scope and spirit of the disclosed subject matter. For example, the prioritization method described in this application can be used in facilities that have complex machines with multiple operational parameters that need to be altered to change the performance of the machines. Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A computer implemented method comprising:
receiving, by one or more processors, lateral data characterizing a lateral vibration of a shaft of a machine, the lateral vibration being time-dependent and indicative of a motion of at least a portion of the shaft perpendicular to a first direction, wherein the lateral vibration is detected by a first sensor located at a first predetermined location on the shaft, wherein the first predetermined location comprises a coupling location of the shaft with a driving mechanism configured to drive the shaft;
receiving, by the one or more processors, torsional data characterizing a torsional vibration of the shaft, the torsional vibration being time-dependent and indicative of rotation of the shaft around the first direction, wherein the torsional vibration is detected by a second sensor located at a second predetermined location on the shaft;
calculating, by the one or more processors, a coherence of the lateral data characterizing the lateral vibration and the torsional data characterizing the torsional vibration;
identifying, by the one or more processors, based on the coherence, a value of a first frequency in a frequency domain indicative of coupling between the lateral vibration and the torsional vibration, wherein the coupling comprises a transfer of energy from the lateral vibration to the torsional vibration or vice versa at the first frequency; and
providing, by the one or more processors, the first frequency and/or at least a portion of the coherence.

2. The computer implemented method of claim 1, wherein the coupling comprises a torsional-lateral cross-coupling indicative of a deformation of the shaft.

3. The computer implemented method of claim 1, wherein the driving mechanism is a gearbox configured to rotate the shaft about a first axis.

4. The computer implemented method of claim 1, wherein the driving mechanism comprises an induction motor configured to rotate the shaft about a first axis.

5. The computer implemented method of claim 1, wherein the second predetermined location is by a node of the lateral vibration of the shaft.

6. The computer implemented method of claim 1, wherein calculating the coherence further comprises:
 calculating a lateral frequency spectrum by transforming the lateral vibration from a time domain to the frequency domain; and
 calculating a torsional frequency spectrum by transforming the torsional vibration in the frequency domain,
 wherein the coherence is based on a product of the lateral frequency spectrum and the torsional frequency spectrum.

7. The computer implemented method of claim 1, wherein identifying the value of the first frequency in the frequency domain comprises identifying a first peak of the coherence wherein the first peak has a value greater than a predetermined threshold value and the first peak is located at the first frequency.

8. The computer implemented method of claim 7, further comprises:
 identifying a value of a second frequency in the frequency domain by at least identifying a second peak of the coherence wherein the second peak has a value greater than the predetermined threshold value and the second peak is located at the second frequency.

9. The computer implemented method of claim 1, wherein calculating comprises transforming the lateral vibration and the torsional vibration from a time domain to a frequency domain.

10. The computer implemented method of claim 1, wherein the first sensor comprises an eddy-current sensor.

11. The computer implemented method of claim 1, wherein the second sensor comprises one of a magnetostrictive torsional sensor, a demodulated torsional sensor, and a strain torsional sensor.

12. The computer implemented method of claim 1, wherein the first sensor comprises an axial vibration sensor configured to provide a signal characterizing an axial vibration of the shaft, the axial vibration being time-dependent and indicative of motion of at least a portion of the shaft parallel to the first direction, wherein the axial vibration sensor is located at the first predetermined location on the shaft.

13. The computer implemented method of claim 1, wherein the second sensor comprises an axial vibration sensor.

14. A system comprising:
 at least one data processor;
 memory coupled to the at least one data processor, the memory storing instructions to cause the at least one data processor to perform operations comprising:
  receiving lateral data characterizing a lateral vibration of a shaft of a machine, the lateral vibration being time-dependent and indicative of a motion of at least a portion of the shaft perpendicular to a first direction, wherein the lateral vibration is detected by a first sensor located at a first predetermined location on the shaft, wherein the first predetermined location comprises a coupling location of the shaft with a driving mechanism configured to drive the shaft;
  receiving torsional data characterizing a torsional vibration of the shaft, the torsional vibration being time-dependent and indicative of rotation of the shaft around the first direction, wherein the torsional vibration is detected by a second sensor located at a second predetermined location on the shaft;
  calculating a coherence of the lateral data characterizing the lateral vibration and the torsional data characterizing the torsional vibration;
  identifying, based on the coherence, a value of a first frequency in a frequency domain indicative of coupling between the lateral vibration and the torsional vibration, wherein the coupling comprises transfer of energy from the lateral vibration to the torsional vibration or vice versa at the first frequency; and
  providing the first frequency and/or at least a portion of the coherence.

15. The system of claim 14, wherein the coupling comprises a torsional-lateral cross-coupling indicative of a deformation of the shaft.

16. The system of claim 14, wherein the driving mechanism is a gearbox configured to rotate the shaft about a first axis.

17. The system of claim 15, wherein the driving mechanism comprises an induction motor configured to rotate the shaft about a first axis.

18. The system of claim 14, wherein the second predetermined location is by a node of the lateral vibration of the shaft.

19. The system of claim 14, wherein calculating the coherence further comprises:
 calculating a lateral frequency spectrum by transforming the lateral vibration from a time domain to the frequency domain; and
 calculating a torsional frequency spectrum by transforming the torsional vibration in the frequency domain,
 wherein the coherence is based on a product of the lateral frequency spectrum and the torsional frequency spectrum.

20. The system of claim 14, wherein identifying the value of the first frequency in the frequency domain comprises identifying a first peak of the coherence wherein the first peak has a value greater than a predetermined threshold value and the first peak is located at the first frequency.

21. The system of claim 20, wherein the operations further comprise identifying a value of a second frequency in the frequency domain by at least identifying a second peak of the coherence wherein the second peak has a value greater than the predetermined threshold value and the second peak is located at the second frequency.

22. The system of claim 14, wherein the calculating comprises transforming the lateral vibration and the torsional vibration from a time domain to a frequency domain.

23. The system of claim 14, wherein the first sensor comprises an eddy-current sensor.

24. The system of claim 14, wherein the second sensor comprises one of a magnetostrictive torsional sensor, a demodulated torsional sensor, and a strain torsional sensors.

25. A computer program product comprising a non-transitory machine-readable medium storing instructions that, when executed by at least one programmable processor that comprises at least one physical core and a plurality of logical cores, cause the at least one programmable processor to perform operations comprising:
 receiving lateral data characterizing a lateral vibration of a shaft of a machine, the lateral vibration being time-dependent and indicative of a motion of at least a portion of the shaft perpendicular to a first direction, wherein the lateral vibration is detected by a first sensor located at a first predetermined location on the shaft, wherein the first predetermined location comprises a coupling location of the shaft with a driving mechanism configured to drive the shaft;

receiving torsional data characterizing torsional vibration of the shaft, the a torsional vibration being time-dependent and indicative of rotation of the shaft around the first direction, wherein the torsional vibration is detected by a second sensor located at a second predetermined location on the shaft;

calculating a coherence of the lateral data characterizing lateral vibration and the torsional data characterizing torsional vibration;

identifying, based on the coherence, a value of a first frequency in a frequency domain indicative of coupling between the lateral vibration and the torsional vibration, wherein the coupling comprises transfer of energy from the lateral vibration to the torsional vibration or vice versa at the first frequency; and providing the first frequency and/or at least a portion of the coherence.

* * * * *